United States Patent
Ha

(10) Patent No.: US 8,363,925 B2
(45) Date of Patent: Jan. 29, 2013

(54) METHOD AND APPARATUS FOR CREATING STEREO IMAGE ACCORDING TO FREQUENCY CHARACTERISTICS OF INPUT IMAGE AND METHOD AND APPARATUS FOR REPRODUCING THE CREATED STEREO IMAGE

(75) Inventor: Tae-hyeun Ha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1941 days.

(21) Appl. No.: 11/289,337

(22) Filed: Nov. 30, 2005

(65) Prior Publication Data
US 2006/0177124 A1    Aug. 10, 2006

(30) Foreign Application Priority Data
Feb. 4, 2005    (KR) .................. 10-2005-0010753

(51) Int. Cl.
G06K 9/00   (2006.01)
G06K 9/46   (2006.01)
G06T 15/00  (2011.01)
G01C 3/14   (2006.01)

(52) U.S. Cl. ........... 382/154; 382/232; 345/419; 356/12

(58) Field of Classification Search .............. 382/154, 382/232–253; 345/419–427; 356/12
See application file for complete search history.

(56) References Cited

U.S. PATENT DOCUMENTS

| 5,786,848 | A | 7/1998 | Isobe et al. | |
|---|---|---|---|---|
| 6,993,159 | B1* | 1/2006 | Ishii et al. | 382/154 |
| 2001/0012054 | A1* | 8/2001 | Sudo | 348/51 |
| 2002/0196332 | A1* | 12/2002 | Lipton et al. | 348/51 |
| 2003/0012425 | A1* | 1/2003 | Suzuki et al. | 382/154 |
| 2003/0128273 | A1 | 7/2003 | Matsui et al. | |
| 2003/0206653 | A1* | 11/2003 | Katayama et al. | 382/154 |
| 2004/0218809 | A1* | 11/2004 | Blake et al. | 382/154 |
| 2005/0078866 | A1* | 4/2005 | Criminisi et al. | 382/154 |
| 2005/0147309 | A1* | 7/2005 | Katata et al. | 382/239 |
| 2006/0239537 | A1* | 10/2006 | Shragai et al. | 382/154 |
| 2007/0183650 | A1* | 8/2007 | Lipton et al. | 382/154 |

FOREIGN PATENT DOCUMENTS

| EP | 1026630 A2 | 8/2000 |
|---|---|---|
| EP | 1501317 A1 | 1/2005 |
| EP | 1501318 A1 | 1/2005 |
| JP | 594522 | 4/1993 |
| JP | 2004-048293 A | 2/2004 |
| JP | 2004-080727 A | 3/2004 |

(Continued)

OTHER PUBLICATIONS

Notice of Allowance for Korean Application No. 10-2005-0010753 dated Oct. 25, 2007 with partial translation.

(Continued)

*Primary Examiner* — Randolph I Chu
(74) *Attorney, Agent, or Firm* — Sughrue Mion, PLLC

(57) ABSTRACT

A method and an apparatus for creating a stereo image adaptively according to the characteristic of an input image and a method and an apparatus for reproducing the created stereo image are provided. The method for creating a stereo image includes selecting one of a left view image and a right view image that constitute the stereo image and measuring the directivity of high frequency components of the selected image, and synthesizing the left view image and the right view image into a stereo image in a format depending on the measured directivity.

6 Claims, 8 Drawing Sheets

FOREIGN PATENT DOCUMENTS

| | | |
|---|---|---|
| KR | 1990-0019519 A | 12/1990 |
| KR | 1991-0004054 A | 2/1991 |
| KR | 10-2002-0054253 A | 7/2002 |
| KR | 1020040001831 A | 1/2004 |
| KR | 10-2004-0058497 A | 7/2004 |
| KR | 1020050049623 * | 5/2005 |

OTHER PUBLICATIONS

Search Report for Dutch Application No. 1031056 dated Feb. 3 2011.

* cited by examiner

HIGH FREQUENCY IN
HORIZONTAL DIRECTION

LEFT VIEW IMAGE

RIGHT VIEW IMAGE

LEFT VIEW IMAGE

RIGHT VIEW IMAGE

HIGH FREQUENCY
IN VERTICAL
DIRECTION

METHOD AND APPARATUS FOR CREATING STEREO IMAGE ACCORDING TO FREQUENCY CHARACTERISTICS OF INPUT IMAGE AND METHOD AND APPARATUS FOR REPRODUCING THE CREATED STEREO IMAGE

CROSS-REFERENCE TO RELATED PATENT APPLICATION

This application claims priority from Korean Patent Application No. 10-2005-0010753, filed on Feb. 4, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to creation of stereo images, and more particularly, to creating a stereo image adaptively according to the characteristics of an input image and reproducing the created stereo image.

2. Description of the Related Art

Recently, research has been conducted on broadcasting three-dimensional (3D) images through digital televisions (DTV). To broadcast 3D images that are similar to actual images viewed by naked human eyes, multi-view 3D images should be created, transmitted, received, and reproduced by a 3D display device. However, since multi-view 3D images contain a large amount of data, they cannot be accommodated by a channel bandwidth used in an existing digital broadcasting system. Thus, priority is being given to studies on the transmission and reception of stereo images.

With respect to 3D image-related technology, the Moving Picture Experts Group (MPEG) developed the MPEG-2 multi-view profile in 1996 and a standard for compression of stereo images and multi-view images is on its way to completion. Related organizations studying 3D images are also actively conducting research on the transmission and reception of 3D images through DTV broadcasting and are currently researching transmission and reception of high definition (HD) stereo images. It is to be noted that HD stereo images indicate interlaced images with resolutions of 1920× 1080 or progressive images with resolutions of 1024×720.

However, since the bandwidth of a transmission channel that transmits MPEG-2 encoded images is limited to 6 MHz in DTV broadcasting, only one HD image can be transmitted through one channel. As a result, it is difficult to transmit an HD stereo image (composed of a left view image and a right view image).

A conventional approach to the problem described above is to transmit an HD stereo image after reducing the amount of data of the HD stereo image to that of an HD mono image by sampling the HD stereo image, i.e., a left view image and a right view image, at a ratio of 1:2 to reduce the total amount of data of the HD stereo image by ½. Another approach to the problem described above is to transmit an HD stereo image after reducing the amount of data of the HD stereo image by reducing the size of one of the left view image and the right view image. However, since such conventional approaches reduce the amount of data through sub-sampling or size reduction, image quality degradation is inevitable.

SUMMARY OF THE INVENTION

The present invention provides a method and an apparatus for adaptively creating a stereo image, wherein the format of the stereo image is changed adaptively according to the characteristics of an input image without a tradeoff between a reduction in the amount of data and image quality, and a method and apparatus for receiving and reproducing the created stereo image.

According to an aspect of the present invention, there is provided a method for creating a stereo image. The method comprises selecting one of a left view image and a right view image that constitute the stereo image and measuring the directivity of high frequency components of the selected image and synthesizing the left view image and the right view image into a stereo image in a format depending on the measured directivity.

The measuring the directivity of the high frequency components comprises measuring high frequency components of the selected image to determine if the selected image has more high frequency components in the horizontal direction or the vertical direction.

The synthesizing the left view image and the right view image comprises creating the stereo image in the top-bottom format if the selected image has more high frequency components in the horizontal direction and creating the stereo image in the side-by-side format if the selected image has more high frequency components in the vertical direction.

According to another aspect of the present invention, there is provided an apparatus for creating a stereo image comprising a frequency measuring unit, a first synthesizing unit, a second synthesizing unit, and a selecting unit. The frequency measuring unit selects one of a left view image and a right view image that constitute the stereo image and measures high frequency components of the selected image to determine if the selected image has more high frequency components in the horizontal direction or the vertical direction. The first synthesizing unit synthesizes the left view image and the right view image into a stereo image with a side-by-side format. The second synthesizing unit synthesizes the left view image and the right view image into a stereo image with a top-bottom format. The selecting unit selects the stereo image output from one of the first synthesizing unit and the second synthesizing unit according to the output of the frequency measuring unit and outputs the selected stereo image.

The frequency measuring unit comprises a horizontal frequency measuring unit, a vertical frequency measuring unit, and a comparing unit. The horizontal frequency measuring unit measures the frequency components of the selected image in the horizontal direction. The vertical frequency measuring unit measures the frequency components of the selected image in the vertical direction. The comparing unit compares the measured frequency components in the horizontal direction and the measured frequency components in the vertical direction and determines the directivity of the stereo image.

The horizontal frequency measuring unit calculates a sum of absolute differences (SAD) between the result of ½ down-sampling and then up-sampling the selected image in the horizontal direction and a delayed selected image. The vertical frequency measuring unit calculates an SAD between the result of ½ down-sampling and then up-sampling the selected image in the vertical direction and a delayed selected image.

According to still another aspect of the present invention, there is provided a method for transmitting a stereo image. The method comprises receiving a left view image and a right view image taken by an apparatus for taking a stereo image, selecting one of the left view image and the right view image, measuring the directivity of high frequency components of the selected image, and synthesizing the left view image and the right view image into a stereo image having a format which depends on the measured directivity, and encoding and transmitting the created stereo image.

According to yet another aspect of the present invention, there is provided a method of reproducing a stereo image. The method comprises receiving information about the directivity of high frequency components in the stereo image and separating the stereo image into a left view image and a right view image according to the received information.

The information about the directivity of the high frequency components in the stereo image is obtained by selecting one of the left view image and the right view image that constitute the stereo image and measuring high frequency components to determine if the selected image has more high frequency components in the horizontal direction or the vertical direction.

According to yet another aspect of the present invention, there is provided an apparatus for reproducing a stereo image. The apparatus comprises of a separating unit and a scaler. The separating unit receives information about the directivity of high frequency components of the stereo image and separates the stereo image into a left view image and a right view image according to the received information. The scaler scales the left view image and the right view image to their respective original sizes according to the information about the directivity.

According to yet another aspect of the present invention, there is provided a method for receiving a stereo image. The method comprises receiving and decoding the stereo image, receiving information about the directivity of high frequency components of the stereo image, and separating the stereo image into a left view image and a right view image having a format which depends on the received directivity information, and outputting the left view image and the right view image.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
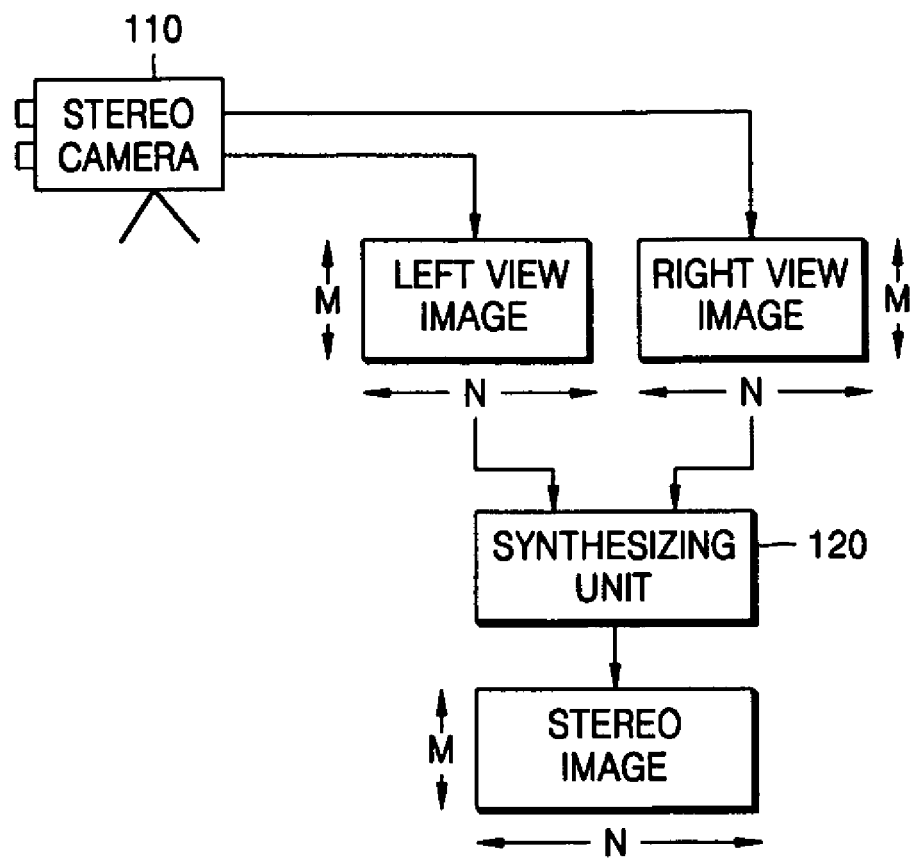
FIG. 1 is a block diagram illustrating the general creation of a stereo image by synthesizing a left view image and a right view image taken by a stereo camera.

FIG. 1 is a block diagram illustrating the general creation of a stereo image by synthesizing a left view image and a right view image taken by a stereo camera.

Referring to FIG. 1, a stereo camera 110 separately takes a left view image and a right view image of an object. When the left view image and the right view image are HD images, the amounts of data of the left view image and the right view image are separately reduced to ½ by sub-sampling the left view image and the right view image for transmission through a channel having a bandwidth of 6 MHz. In other words, a synthesizing unit 120 sub-samples and then synthesizes the left view image and the right view image to create a single HD stereo image.

When the synthesizing unit 120 sub-samples and synthesizes the left view image and the right view image, it can synthesize the two images into various formats. Sub-sampling varies according to a format of a stereo image to be created. Hereinafter, the creation of a stereo image by the synthesizing unit 120 will be described with reference to FIGS. 2A through 2D.

FIGS. 2A through 2D illustrate various formats of a stereo image.

Figure 2A:
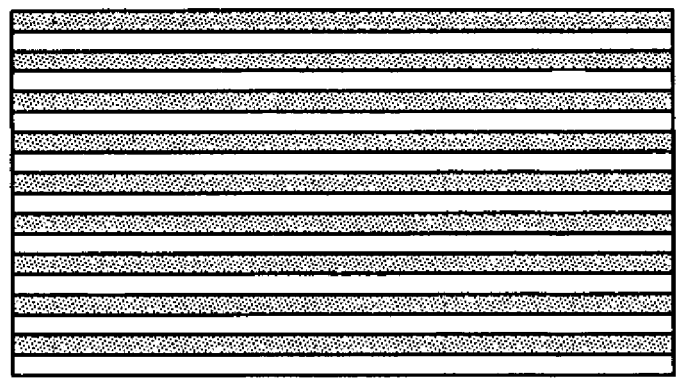
FIGS. 2A through 2D illustrate various formats of a stereo image.
Figure 2B:
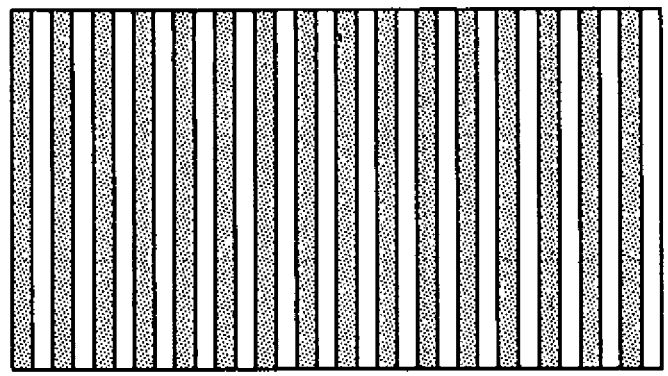
Figure 2C:
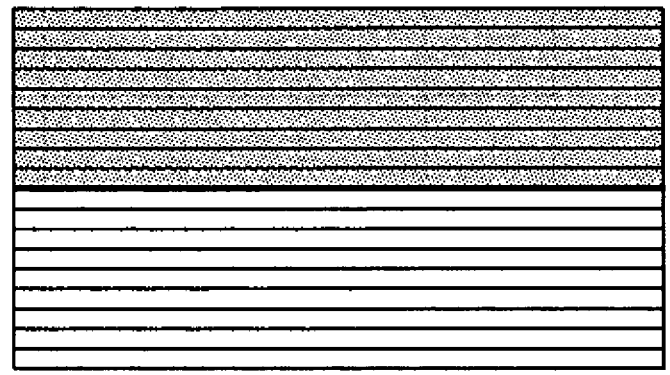
Figure 2D:
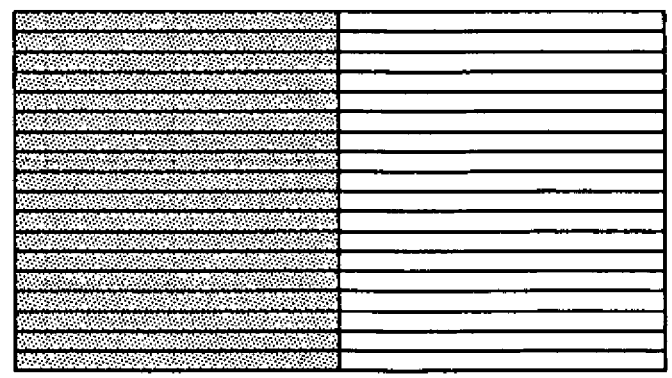

FIG. 2A illustrates a line-by-line format of a stereo image. To create a stereo image using the line-by-line format, a left view image and a right view image are separately ½ sub-sampled in the vertical direction and each line of pixels of the sampled left view image and each line of pixels of the sampled right view image are alternated with each other. FIG. 2B illustrates a pixel-by-pixel format of a stereo image. To create a stereo image using the pixel-by-pixel format, a left view image and a right view image are separately ½ sub-sampled in the horizontal direction and each row of pixels of the sampled left view image and each row of pixels of the sampled right view image are alternated with each other. FIG. 2C illustrates a top-bottom format of a stereo image. To create a stereo image using the top-bottom format, a left view image and a right view image are separately ½ sub-sampled in the vertical direction, then the sampled left view image is positioned in a top half of the stereo image, and the sampled right view image is positioned in a bottom half of the stereo image. In other words, an N×M left view image and an N×M right view image are separately sub-sampled into N×M/2 images, the sampled N×M/2 left view image is positioned in a top half of the stereo image, and the sampled N×M/2 right view image is positioned in a bottom half of the stereo image, thereby creating an N×M stereo image. FIG. 2D illustrates a side-by-side format of a stereo image. In this case, a left view image and a right view image are separately ½ sub-sampled in the horizontal direction, the sampled left view image is positioned in a left half of a stereo image, and the sampled right view image is positioned in a right half of the stereo image. In other words, an N×M left view image and an N×M right view image are separately ½ sub-sampled into N/2×M images, the N/2×M sampled left view image is positioned in a left half of the stereo image, and the N/2×M sampled right view image is positioned in a right half of the stereo image, thereby creating an N×M stereo image.

Among the various formats of a stereo image, the top-bottom format shown in FIG. 2C and the side-by-side format shown in FIG. 2D are efficient for MPEG compressed image transmission, and thus have been widely used.

Figure 3:
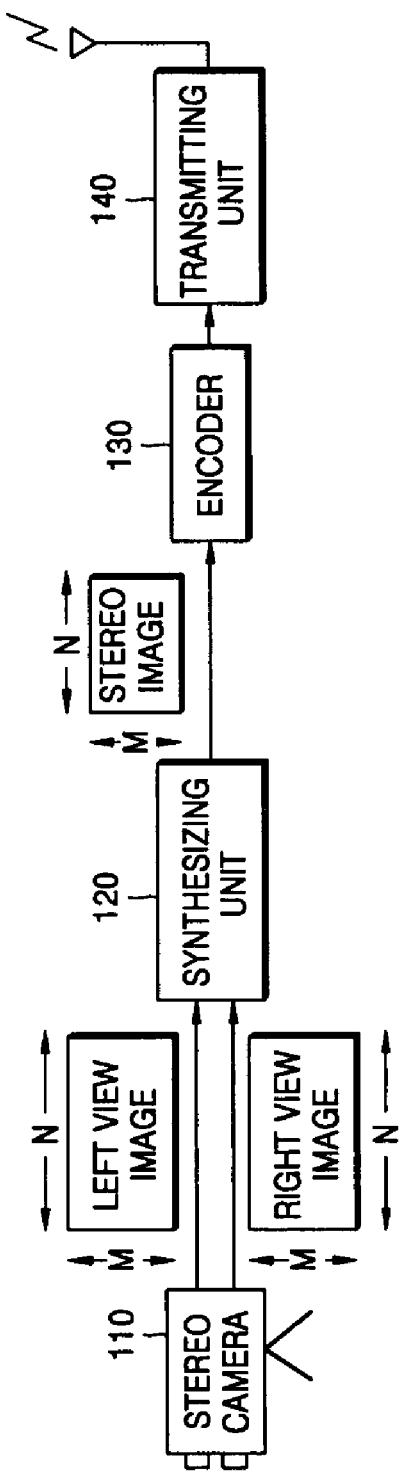
FIG. 3 is a block diagram of a general apparatus for transmitting a stereo image.

FIG. 3 is a block diagram of a general apparatus for transmitting a stereo image.

Referring to FIG. 3, an N×M left view image and an N×M right view image that are taken by the stereo camera 110 are sub-sampled and synthesized by the synthesizing unit 120 into an N×M stereo image having one of the various formats described with reference to FIGS. 2A through 2D. An encoder 130 encodes the created stereo image according to MPEG or various standards. A transmitting unit 140 transmits the encoded stereo image according to a digital broadcasting standard or other transmission standards.

Figure 4:
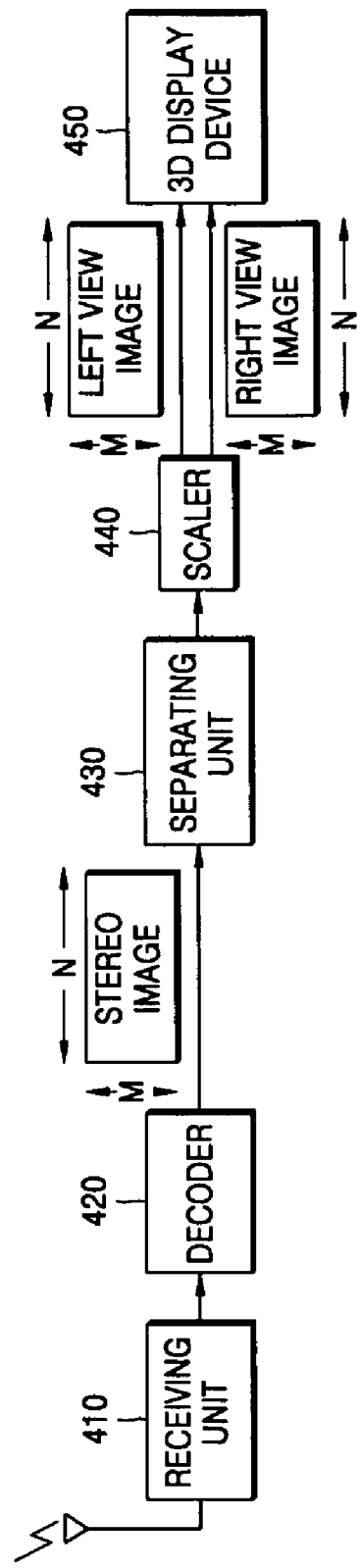
FIG. 4 is a block diagram of a general apparatus for receiving a stereo image.

FIG. 4 is a block diagram of a general apparatus for receiving a stereo image.

Referring to FIG. 4, a receiving unit 410 receives the stereo image transmitted from the apparatus for transmitting a stereo image. A decoder 420 performs decoding according to the encoding standard used by the apparatus for transmitting a stereo image. For example, if encoding is performed in accordance with the MPEG-2 standard, decoding is also performed according to the MPEG-2 standard. The N×M stereo image output from the decoder 420 is input to a separating unit 430 to separate the stereo image into a left view image and a right view image. Since sub-sampling is performed during the creation of a stereo image to reduce the amounts of data of the left view image and the right view image, the sizes of the separated left view image and right view image are smaller than their original sizes. Thus, a scaler 440 scales the separated left view image and right view image to their respective original sizes. If the received stereo image has the top-bottom format, the scaler 440 up-scales the separated left view image and right view image in the vertical direction. If the received stereo image has the side-by-side format, the scaler 440 up-scales the separated left view image and right view image in the horizontal direction. In other words, an N×M left view image and an N×M right view image are obtained. A 3D display device 450 displays the created left view image and right view image.

In the apparatus for transmitting or receiving a stereo image, the resolutions of the left view image and the right view image are reduced by ½ to transmit the stereo image through a limited-bandwidth channel. As a result, the resolution of the received stereo image is also reduced by ½. In other words, since the synthesizing unit 120 down-samples a left view image and a right view image during the creation of the stereo image, loss of image quality cannot be overcome even if the scaler 440 scales the down-sampled left view image and right view image to their original sizes.

Therefore, in an exemplary embodiment of the present invention, loss of image quality is minimized by adaptively changing the format of a stereo image to be created according to the characteristic of an input image. In other words, instead of creating a stereo image of one of various formats as shown in FIGS. 2A through 2D, a synthesizing unit determines a direction in which an input image has more high frequency components and changes the format of a stereo image to be created according to the result of the determination.

Figure 5A:
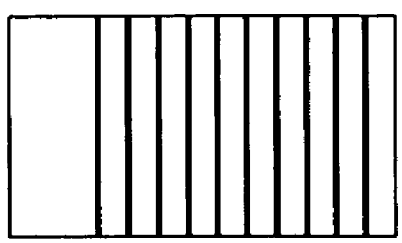
FIGS. 5A and 5B illustrate examples of images having more frequency components in the vertical and horizontal directions respectively.
Figure 5A:
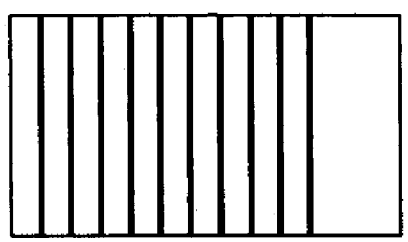
Figure 5B:
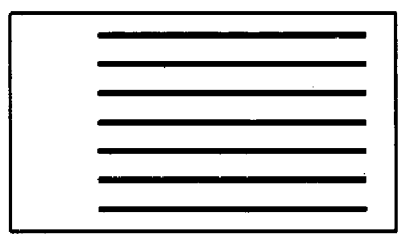
Figure 5B:
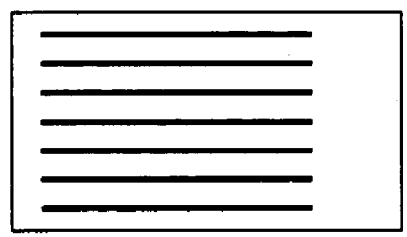

FIGS. 5A and 5B illustrate examples of images having more high frequency components in the horizontal and vertical directions, respectively.

FIG. 5A illustrates images having more high frequency components in the horizontal direction. Referring to FIG. 5A, since there are relatively fewer changes in pixel values in the vertical direction than in the horizontal direction, it can be seen from a frequency analysis that there are more high frequency components in the horizontal direction. If there are more high frequency components in the horizontal direction, loss of image quality may be small during decompression through scaling when a stereo image is created in the top-bottom format. This is because data loss is small even when a left view image and a right view image are sub-sampled in the vertical direction to create a stereo image in the top-bottom format. If there are more high frequency components in the vertical direction as shown in FIG. 5B, loss of image quality may be small during decompression through scaling when a stereo image is created in the side-by-side format. In other words, in the images shown in FIG. 5B, the change in pixel values in the vertical direction is larger relative to that in the horizontal direction. Thus, data loss is small even when the left view image and the right view image are sub-sampled to create a stereo image in the side-by-side format.

Thus, in an exemplary embodiment of the present invention, frequency characteristics of an input image in the horizontal or vertical direction are identified and a stereo image is created in a variable format according to the identified characteristics. As indicated in FIG. 5A, when an input image has more high frequency components in the horizontal direction, a stereo image is created in the top-bottom format. As shown in FIG. 5B, when an input image has more high frequency components in the vertical direction, a stereo image is created in the side-by-side format. In other words, the characteristics of every input image are identified or the characteristics of input images are identified at predetermined time intervals, a format of a stereo image to be created is determined, and a stereo image is created in the determined format.

Figure 6:
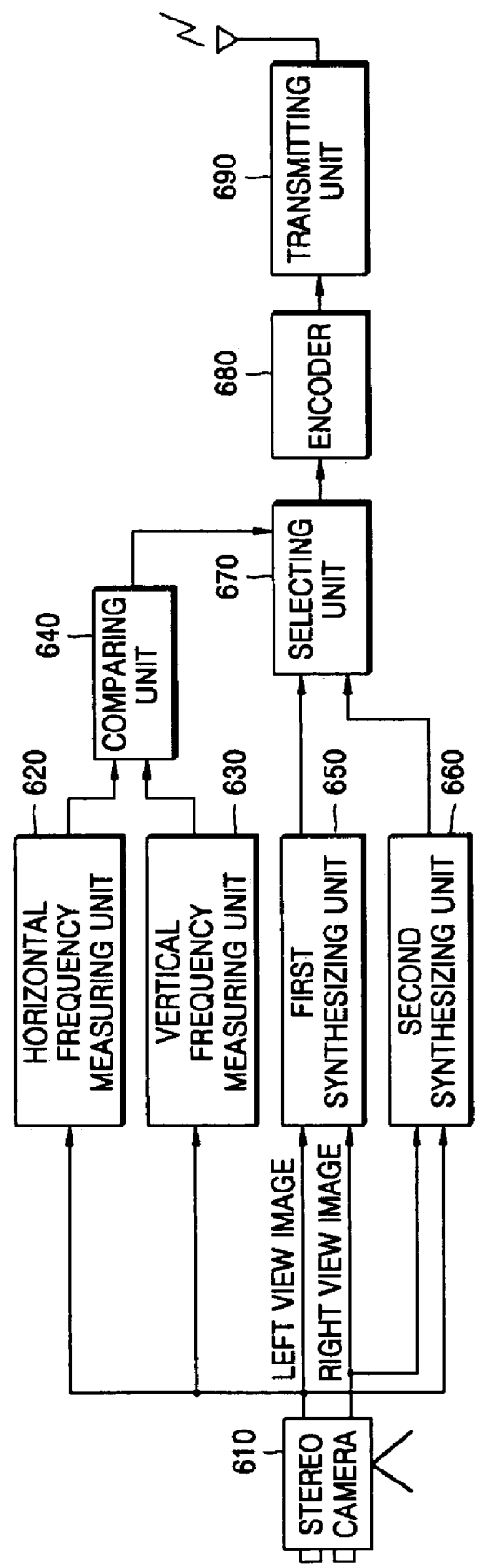
FIG. 6 is a block diagram of an apparatus for transmitting a stereo image according to an exemplary embodiment of the present invention.

FIG. 6 is a block diagram of an apparatus for transmitting a stereo image according to an exemplary embodiment of the present invention.

Referring to FIG. 6, a stereo camera 610 generates and outputs a left view image and a right view image of an object. The output left view image and right view images are input to a first synthesizing unit 650 and a second synthesizing unit 660. One of the output left view image and right view image is also input to a horizontal frequency measuring unit 620 and a vertical frequency measuring unit 630 to identify the frequency characteristics of the input image. The first synthesizing unit 650 synthesizes the input left view image and right view image into a stereo image with the side-by-side format as shown in FIG. 2D. The second synthesizing unit 660 synthesizes the input left view image and right view image into a stereo image with the top-bottom format as shown in FIG. 2C.

The horizontal frequency measuring unit 620 receives the input left view image and right view image and measures frequency components in the horizontal direction. Since the frequency characteristics of the left view image and right view image are generally similar during the same time period, the frequency characteristics of only one of the left view image and the right view image need to be measured. Measurement of the frequency components in the horizontal direction may be performed by calculating a difference between pixel values of a decompressed image obtained after sub-sampling an input image in the horizontal direction and pixel values of the original input image. The difference between the pixel values may be, for example, a sum of absolute differences (SAD). Similarly, the vertical frequency measuring unit 630 receives either a left view image or a right view image and measures high frequency components of the received image in the vertical direction. Measurement of the frequency components in the vertical direction may be performed by calculating a difference between pixel values of a decompressed image obtained after sub-sampling an input image in the vertical direction and pixel values of the original input image. A comparing unit 640 compares the difference between the pixel values output from the horizontal frequency measuring unit 620 and the difference between the pixel values output from the vertical frequency measuring unit 630, determines the frequency characteristic of the input image having the larger difference, and outputs the frequency characteristics to a selecting unit 670.

The selecting unit 670 selects the output of one of the first synthesizing unit 650 and the second synthesizing unit 660 according to the result of determination received from the comparing unit 640 and outputs the selected image. In other words, if it is determined that there are more high frequency components in the horizontal direction, the selecting unit 670 selects the output of the second synthesizing unit 660 that creates a stereo image with a top-bottom format. If it is determined that there are more high frequency components in the vertical direction, the selecting unit 670 selects the output of the first synthesizing unit 650 that creates a stereo image with a side-by-side format.

An encoder 680 encodes the selected image output by the selecting unit 670. Encoding can be performed in accordance with various encoding standards including MPEG standards. A transmitting unit 690 transmits the encoded image.

Hereinafter, the measurement of frequency components using an SAD will be described in detail with reference to FIGS. 7A and 7B.

Figure 7A:
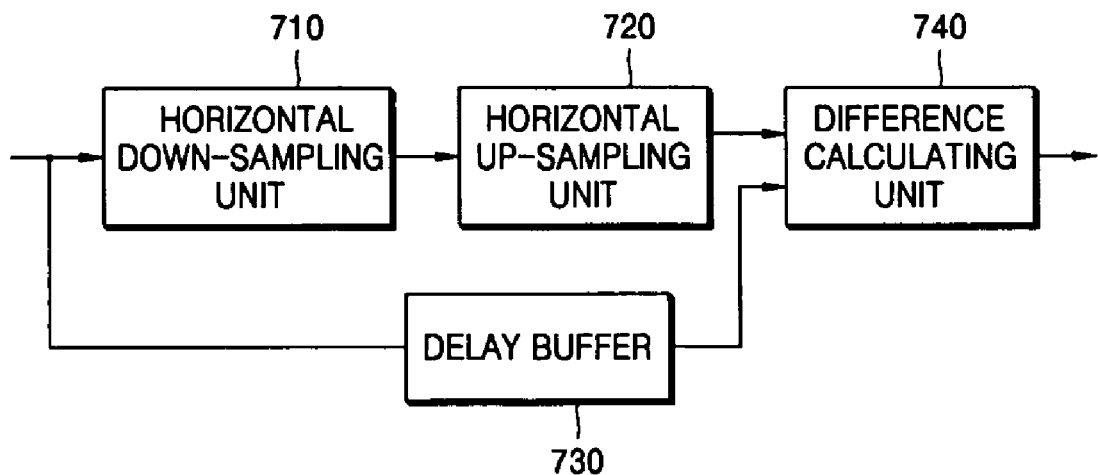
FIG. 7A is a detailed block diagram of a horizontal frequency measuring unit included in the apparatus illustrated in FIG. 6.

FIG. 7A is a detailed block diagram of the horizontal frequency measuring unit 620.

The horizontal frequency measuring unit 620 includes a horizontal down-sampling unit 710, a horizontal up-sampling unit 720, a delay buffer 730, and a difference calculating unit 740. The horizontal down-sampling unit 710 ½ down-samples an N×M input image in the horizontal direction. Thus, the N×M input image is changed to an N/2×M image. The horizontal up-sampling unit 720 up-samples the N/2×M image to decompress the image to an N×M image. It is to be noted that the up-sampling method is the same as that used in an apparatus for receiving a stereo image. The difference calculating unit 740 calculates an SAD between an image obtained by delaying the original image through the delay buffer 730 and the decompressed image output by the horizontal up-sampling unit 720. The difference calculating unit 740 may also output a result using other comparing methods. For example, a normalized mean absolute difference (MAD) that is obtained by normalizing an SAD or a peak signal to noise ratio (PSNR) may be used for comparison.

Figure 7B:
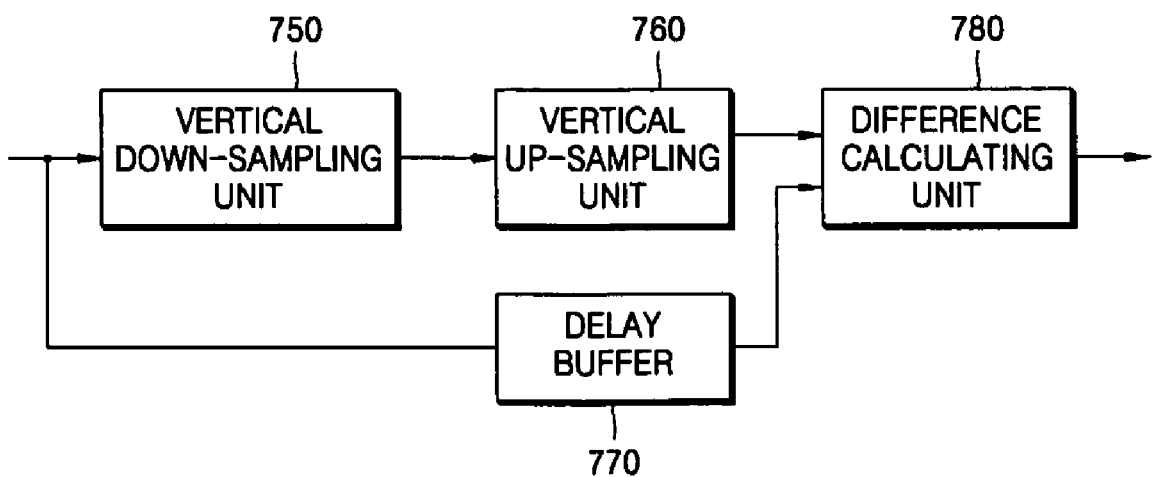
FIG. 7B is a detailed block diagram of a vertical frequency measuring unit included in the apparatus illustrated in FIG. 6.

FIG. 7B is a detailed block diagram of the vertical frequency measuring unit 630.

The vertical frequency measuring unit 630 includes a vertical down-sampling unit 750, a vertical up-sampling unit 760, a delay buffer 770, and a difference calculating unit 780. The vertical down-sampling unit 750 ½ down-samples an N×M input image in the vertical direction. Thus, the N×M input image is changed to an N×M/2 image. The vertical up-sampling unit 760 up-samples the N×M/2 image to decompress the image to an N×M image. It is to be noted that the up-sampling method is the same as that used in an apparatus for receiving a stereo image. The difference calculating unit 780 calculates an SAD between an image obtained by delaying the original image through the delay buffer 770 and the decompressed image output by the vertical up-sampling unit 760.

As such, a direction in which the original image has more high frequency components can be determined based on the output of the horizontal frequency measuring unit 620 and the vertical frequency measuring unit 630.

Figure 8:
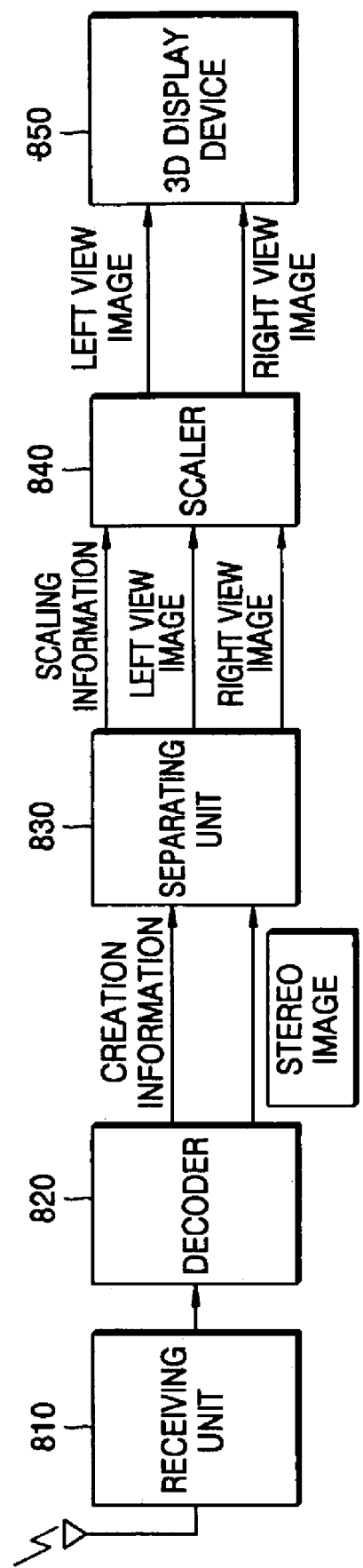
FIG. 8 is a block diagram of an apparatus for receiving a stereo image according to an exemplary embodiment of the present invention.

FIG. 8 is a block diagram of an apparatus for receiving a stereo image according to an exemplary embodiment of the present invention.

The apparatus for receiving a stereo image includes a receiving unit 810, a decoder 820, a separating unit 830, and a scaler 840. The receiving unit 810 receives a broadcasted stereo image. The decoder 820 performs decoding in accordance with the encoding standard used in the apparatus for transmitting a stereo image. For example, when encoding is performed according to the MPEG-2 standard, decoding is also performed according to the MPEG-2 standard. The N×M stereo image output from the decoder 820 is input to the separating unit 830 to separate the stereo image into a left view image and a right view image. At this time, the separating unit 830 receives information about the format in which the stereo image was created from the decoder 820 and separates the stereo image into a left view image and a right view image according to the received information.

The scaler 840 scales the left view image and the right view image to their original sizes. At this time, scaling is performed in the vertical direction or horizontal direction according to the information about the format in which the stereo image was created. Thus, an N×M left view image and an N×M right view image are created. A 3D display device 850 displays the created left view image and right view image.

Figure 9:
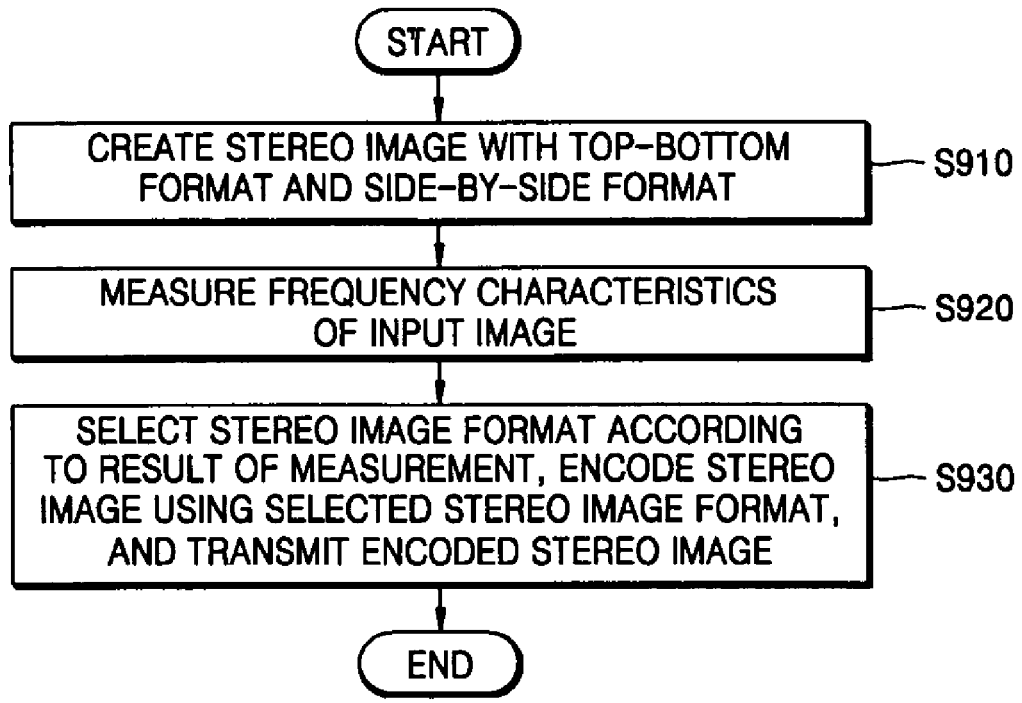
FIG. 9 is a flowchart illustrating a method of transmitting a stereo image according to an exemplary embodiment of the present invention.

FIG. 9 is a flowchart illustrating a method of transmitting a stereo image according to an exemplary embodiment of the present invention.

In operation S910, a left view image and a right view image that are outputted from a stereo camera are synthesized into a stereo image in a top-bottom format and a stereo image in a side-by-side format. In operation S920, one of the left view image and the right view image is selected and a direction in which the selected view image has more high frequency components is determined by measuring frequency components in the horizontal direction and in the vertical direction. One of the stereo images in the side-by-side format and the top-bottom format is selected according to the result of measurement in operation S920, and the selected stereo image is encoded according to MPEG or another moving picture coding standard, and the encoded stereo image is transmitted in operation S930. In other words, if there are more high frequency components in the horizontal direction, the stereo image with the top-bottom format is selected and encoded. If there are more high frequency components in the vertical direction, the stereo image with the side-by-side format is selected and encoded.

Figure 10:
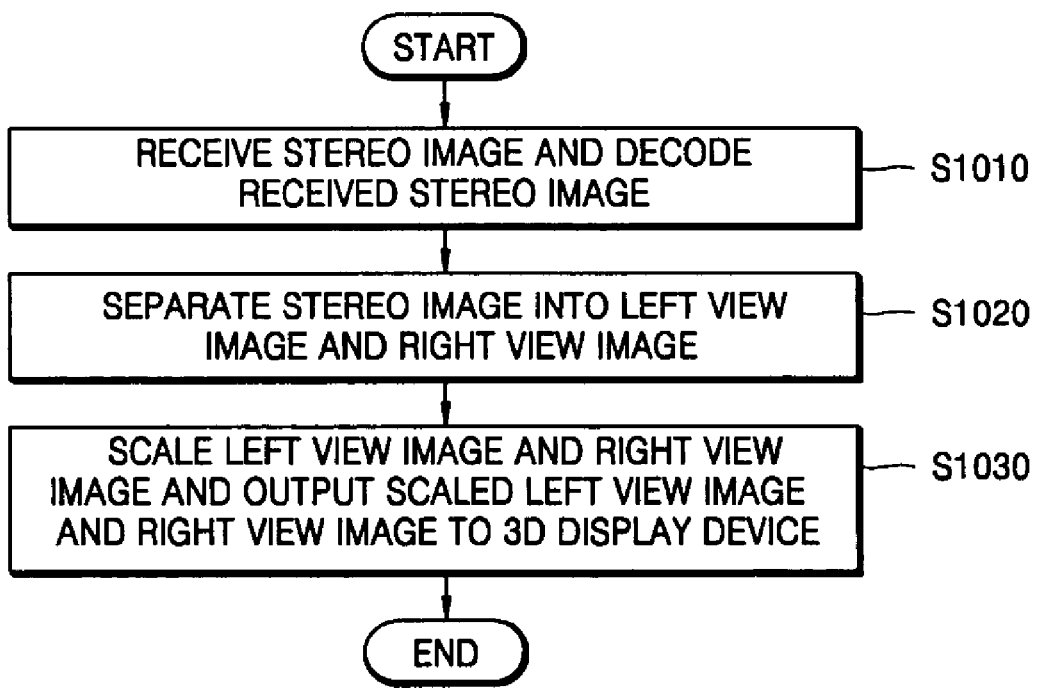
FIG. 10 is a flowchart illustrating a method of receiving a stereo image according to an exemplary embodiment of the present invention.

FIG. 10 is a flowchart illustrating a method of receiving a stereo image according to an exemplary embodiment of the present invention.

In operation S1010, a stereo image is received from a transmitting unit and is decoded. The decoded stereo image is separated into a left view image and a right view image in operation S1020. For the separation of the stereo image, information about the format in which the stereo image has been created is also received and the stereo image is separated based on the received information. Since it cannot be determined whether the decoded stereo image is in the top-bottom format or the side-by-side format directly from the decoded stereo image, the decoded stereo image is separated into a left view image and a right view image based on information about the format in which the stereo image has been created. The separated left view image and right view image are decompressed to the original size images through scaling and are output to a 3D display device in operation S1030. During scaling, if the information about the format in which the stereo image has been created indicates a top-bottom format, up-scaling is performed in the vertical direction. If the information about the format in which the stereo image has been created indicates a side-by-side format, up-scaling is performed in the horizontal direction.

As described above, according to the present invention, it is possible to reduce loss of image quality resulting from the creation of a stereo image by changing an image format adaptively according to the frequency characteristics of an input image.

The method for adaptively creating a stereo image can also be embodied as a computer program. Code and code segments forming the computer program can be easily construed by computer programmers skilled in the art. The computer program is stored in a computer readable media and read and executed by a computer, thereby implementing the method for adaptively creating a stereo image. Examples of the computer readable media include magnetic tapes, optical data storage devices, and carrier waves.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of creating a stereo image, the method comprising using a processor to perform:
   selecting only one of a left view image and a right view image as a selected image;
   measuring a directivity of high frequency components of the selected image; and
   synthesizing the left view image and the right view image into a stereo image having a format which depends on the measured directivity.

2. The method of claim 1, wherein the measuring the directivity of the high frequency components comprises measuring high frequency components of the selected image to determine if the selected image has more high frequency components in a horizontal direction or a vertical direction.

3. The method of claim 2, wherein the format of the stereo image is a side-by-side format or a top-bottom format.

4. The method of claim 2, wherein the synthesizing the left view image and the right view image comprises creating the stereo image in a top-bottom format if the selected image has more high frequency components in the horizontal direction and creating the stereo image in a side-by-side format if the selected image has more high frequency components in the vertical direction.

5. A method of transmitting a stereo image, the method comprising using a processor to perform:
   receiving left view image and a right view image taken;
   selecting only one of the left view image and the right view image as a selected image;
   measuring a directivity of high frequency components of the selected image;
   synthesizing the left view image and the right view image into a stereo image having a format which depends on the measured directivity; and
   encoding and transmitting the stereo image.

6. The method of claim 5, wherein the synthesizing the stereo image comprises creating the stereo image in a top-bottom format if the measured directivity indicates more high frequency components in a horizontal direction and creating the stereo image in a side-by-side format if the measured directivity indicates more high frequency components in a vertical direction.

* * * * *